Feb. 10, 1948.  E. A. BANSCHBACH  2,435,919
VEHICLE ARRESTOR
Original Filed Sept. 10, 1941

INVENTOR:
Edward A. Banschbach

Patented Feb. 10, 1948

2,435,919

UNITED STATES PATENT OFFICE 2,435,919

VEHICLE ARRESTOR

Edward A. Banschbach, Madison, Wis.

Original application September 10, 1941, Serial No. 410,302. Divided and this application July 26, 1944, Serial No. 547,137

15 Claims. (Cl. 188—32)

This application is a division of my application Serial No. 410,302, filed Sept. 10, 1941, Patent No. 2,356,559, issued August 22, 1944.

This invention relates in general to an obstruction in or upon a roadway, to arrest and stop vehicles thereon, and has more particular reference to a yielding or resilient obstruction for engaging and gradually stopping a vehicle and thereby protecting it and its occupants from danger or injury, and also preventing the vehicle from passing the obstruction and thereby protecting pedestrians and others outside of the vehicle.

An important object of the invention is in the provision of a safety appliance for use in highways for arresting and stopping vehicles and for providing a visible barrier which affords protection to pedestrians or persons waiting at the side of or in a roadway.

A further important object of the invention is in the provision of a vehicle arrestor which will stop a vehicle, such as an automobile, without undue violence to the car or its occupants.

Other and further objects will appear hereinafter, the preferred constructions being illustrated in the accompanying drawings, in which.

Waiting pedestrians and other vehicles may be protected upon or along a highway by a rigid barrier of stone, concrete, and the like, but by providing a yielding arrestor of the roadway, barrier, or safety island type, even a heavily loaded and speeding vehicle may be safely arrested and stopped without danger to it or its load, to passengers in it, or to other persons adjacent the arrestor.

Figure 1:
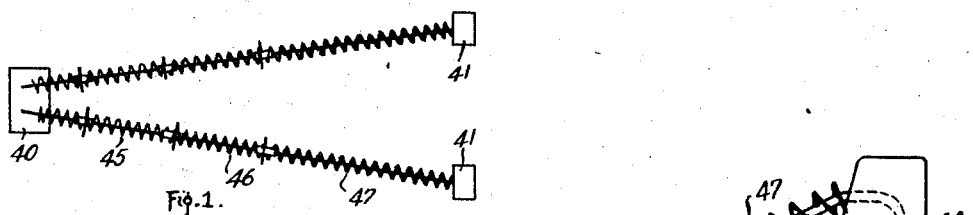
Fig. 1 is a plan view.
Figure 2:
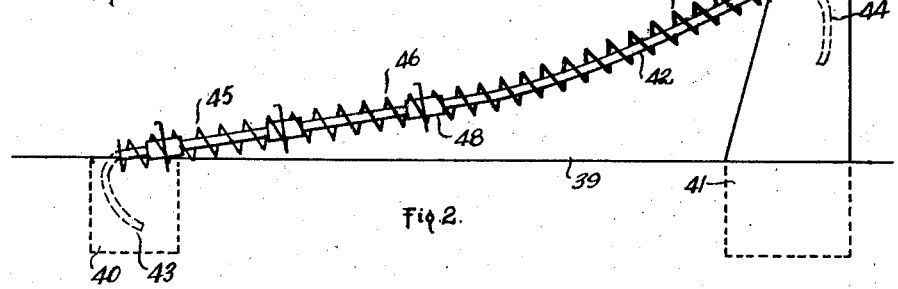
Fig. 2 is a side elevation of an arrestor of the roadway or safety island type.

For a permanent arrestor, at the roadside, or as a safety island, the constructions shown by Figs. 1 to 7 are provided. As shown in Figs. 1 and 2 a block of concrete or masonry 40 is set into and with its top flush with the roadway 39. At a distance therefrom along the roadway one or more similar block barriers are set in the ground projecting above the surface of the roadway three or four feet, or more, to provide a permanent stop abutment and protection. Extending between the blocks 40 and 41 are rigid bars or rails 42 with their ends permanently connected therein as by end hooks 43 and 44. Surrounding and movable upon the rail are spring sections 45, 46 and 47 of graduated strength or resistance, with guides 48 and projections or hooks in connection with the springs at intervals adapted to engage the undergear or chassis portions of a vehicle. Adjacent rails are similarly inclined, gradually at first and then more abruptly where it approaches the abutment 41.

Figures 3, 4:
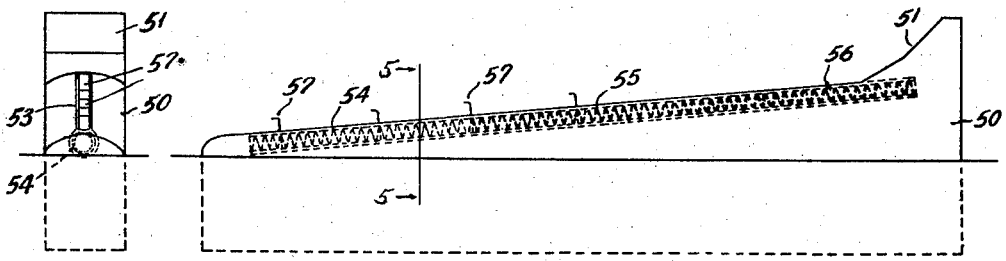
Fig. 3 is a side elevation.
Fig. 4 is an end view of an enclosed arrestor of the safety island type.

Instead of an exposed spring arrestor, a continuous concrete or other solid abutment 50 may be set into the roadway, as shown by Figs. 3 and 4. The upper contact surface is inclined and has a more abrupt stop portion 51 at the rear end. A hollow conduit 52 is set in the abutment having a top slot 53 open through the top of the abutment. In the conduit are positioned a number of spring sections 54, 55 and 56 of graduated strength or resistance, free to move longitudinally, and secured to the springs and projecting through the slot at intervals are hooks 57 adapted to engage the undergear or chassis portions of a vehicle as it moves up on the abutment 50.

Any vehicle engaging these arrestors, even at high speed, is first gradually retarded by the springs and is finally stopped by the end abutment. In the safety island type, vehicles are warded off or deflected if crowded into the arrestor, and if unavoidable the vehicles slide up the inclines against the smooth, gradual increasing spring resistance until brought to a safe, protected stop.

Figures 8, 9:
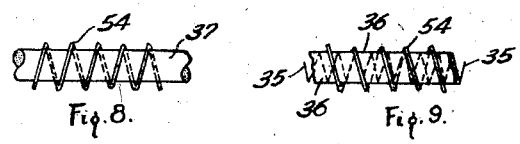
Fig. 8 illustrates an arrestor spring surrounding a sponge rubber filler.
Fig. 9 shows an arrestor spring with an inner filler distended by a lighter spring.
Figure 5:
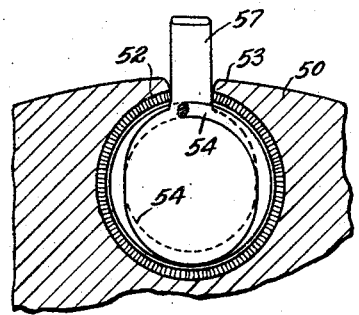
Fig. 5 is a section taken on the line 5—5 of Fig. 3.
Figure 6:
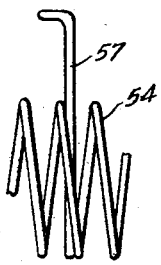
Fig. 6 is a side view of a spring section and one of the vehicle hooks of Fig. 5.
Figure 7:
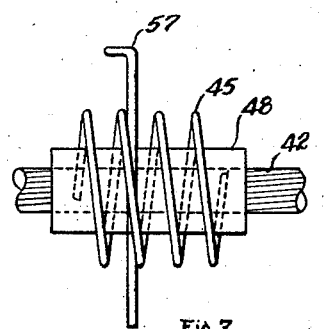
Fig. 7 is a detail side view of one of the vehicle hooks of Fig. 2.

In the invention shown particularly in Figs. 3 and 4, it is desirable to provide means for preventing the formation of ice in a solid mass between the springs and the coils thereof. As shown in Fig. 8 a highly compressible filler 37 of sponge rubber and the like may occupy the central space within a spring 54 so that the interior is entirely filled up, preventing this space from filling with water and freezing solid.

An alternative construction is shown in Fig. 9 comprising a waterproof envelope or cylindrical bag 36 distended by a light spring 35. These may be inserted in units of several feet in length like the coil spring sections and are compressible with the spring when the spring is engaged by a vehicle. In winter weather when there is slush, freezing and thawing, these highly compressible fillers of full inner diameter of the graduated compression springs cause the water to freeze and ice to form between the coils only of the outer compression springs. When a vehicle impacts these resisting springs, the ice being a thin cover will instantly and readily crush, thus offering little added resistance. At this time the crushed ice will slightly compress the diameter of these highly compressible spring fillers and freezing will affect the vehicle arresting spring action very little, if at all. Even if the space between the coils fills and evens up to the overhead slot at the surface, this ice will be crushed readily by the impact of a vehicle.

During the summer or warm seasons these fillers may be removed and cleaned, or left out entirely, although they serve also to prevent the admission of dirt and debris from the street.

Various other changes in the construction, combination and arrangement of the parts may be made without departing from the spirit and scope of the invention.

What I claim is:

1. A vehicle arrestor comprising an upwardly inclined track located above the ground, and a plurality of graduated spring sections extending in succession along said track arranged to be slidably engaged by an approaching vehicle for arresting the vehicle.

2. A vehicle arrestor comprising a series of spring sections of graduated strength extending lengthwise of a highway and having means projecting therefrom at intervals to engage, arrest and stop a vehicle upon impact therewith.

3. In a vehicle arrestor, a track, a plurality of spring sections extending longitudinally of a highway and inclined upwardly in the direction of movement of a vehicle thereon, said springs adapted to be stressed by a vehicle running gear and said track adapted to raise the front of the vehicle from the highway upon impact therewith, arresting and stopping the vehicle.

4. In a vehicle arrestor, the combination of a track and a plurality of graduated spring sections arranged in series longitudinally of a highway and inclined upwardly in the direction of travel of a vehicle thereon for engaging, arresting and stopping the vehicle.

5. In a vehicle arrestor, a track and a succession of graduated spring sections extending longitudinally of a highway and inclined upwardly in the direction of travel of a vehicle thereon, means projecting from the springs for engaging the chassis of a vehicle, said track raising the front of the vehicle upon impact with the track and engaging means, arresting and stopping the vehicle.

6. In a vehicle arrestor, a plurality of graduated spring sections arranged in succession and extending longitudinally of the highway, and means for slidably supporting the sections in an inclined position upwardly in the direction of travel of a vehicle thereon.

7. A vehicle arrestor comprising a guide rigidly fixed at its ends and extending in an upwardly inclined direction longitudinally of a highway, and a plurality of spring sections mounted thereon for sliding movement, the spring sections being graduated in their resistance from the lowest to the highest portion of the guide, and means projecting from the springs at intervals for engaging a vehicle for arresting and stopping it upon impact therewith.

8. In a vehicle arrestor, an inclined fixed guide extending longitudinally of a highway and comprising a passage with an open slot at the top, a plurality of spring sections of graduated strength mounted in succession in the slot and means projecting through the slot from the spring sections adapted to engage, arrest and stop a vehicle upon impact therewith.

9. In a vehicle arrestor, a guide with a passageway extending longitudinally of a highway, having an open slot at the top, a plurality of spring sections mounted in and movable in the passageway, means projecting from the passageway through the slot for engaging a vehicle upon the highway and a compressible filler adapted to occupy the space internally of the springs.

10. A vehicle arrestor comprising a plurality of springs of graduated resistance arranged in succession and extending longitudinally of a highway with the section of least resistance first in the direction of travel of a vehicle thereon, a support for the spring sections comprising a heavy guide bar upon which the spring sections are movable, the front end of the bar being secured in a concrete block of which the top is flush with the roadway and the rear of the bar being supported above the roadway by a concrete block extending above but embedded in the ground below the roadway.

11. A vehicle arrestor comprising a plurality of springs of graduated resistance arranged in succession and extending longitudinally of a highway with the section of least resistance first in the direction of travel of a vehicle thereon, a fixed concrete block having a passage in which the spring sections are contained inclined upwardly from the front to the rear of the spring sections and providing a continuous obstruction of the safety island type increasing in heighth in the direction of travel of a vehicle.

12. A vehicle arrestor comprising a plurality of springs of graduated resistance arranged in succession and extending longitudinally of a highway with the section of least resistance first in the direction of travel of a vehicle thereon, a tubular container for the spring sections extending in an upwardly inclined position upon a highway and having a slot communicating at the top with the outer surface of the container, bumpers at the spring ends in a position to engage the front of a vehicle in its direction of movement and to compress the spring sections in succession upon impact therewith.

13. An assembly positioned above the ground level, comprising an inclined vehicle arresting obstruction having a base of substantial material and a conduit with resilient means therein adapted to oppose movement of a vehicle contacting and sliding upwardly along said inclined obstruction.

14. Vehicle obstructing means including an assembly of inclined members diverging upwardly and raised above the ground level, resilient means carried by the inclined members, vehicle front engaging means projecting upwardly above the inclined members and operatively connected with the resilient means.

15. In an elevated above the ground level or roadway surface vehicle obstructing and arresting assembly, a graduated series of coil springs, upwardly projecting means positioned between the coil spring ends, and opposing the forward movement of forward moving vehicles, by compressing the series of graduated sizes of coil springs which act in proportion to the weight and mass momentum of the moving forward vehicle.

EDWARD A. BANSCHBACH.

REFERENCES CITED

The following references are of record in the file of this patent:

UNITED STATES PATENTS

| Number | Name | Date |
|---|---|---|
| 861,785 | Wilson | July 30, 1907 |
| 1,551,556 | Gust | Sept. 1, 1925 |
| 1,997,945 | Olaszy | Apr. 16, 1935 |
| 2,022,745 | Slavin | Dec. 3, 1935 |
| 2,175,636 | Morgan | Oct. 10, 1939 |
| 2,235,836 | King | Mar. 25, 1941 |
| 2,356,559 | Banschbach | Aug. 22, 1944 |